United States Patent
Okada et al.

(10) Patent No.: US 10,705,330 B2
(45) Date of Patent: Jul. 7, 2020

(54) LENS, LENS UNIT, AND IMAGING APPARATUS

(71) Applicant: KYOCERA Corporation, Kyoto (JP)

(72) Inventors: Hiroshi Okada, Yokohama (JP);
Katsumi Tsuji, Yokohama (JP);
Yasushi Koshiba, Yokohama (JP);
Takatoshi Nakata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/531,215

(22) PCT Filed: Nov. 27, 2015

(86) PCT No.: PCT/JP2015/005924
§ 371 (c)(1),
(2) Date: May 26, 2017

(87) PCT Pub. No.: WO2016/084390
PCT Pub. Date: Jun. 2, 2016

(65) Prior Publication Data
US 2017/0329131 A1   Nov. 16, 2017

(30) Foreign Application Priority Data

Nov. 27, 2014   (JP) .................................. 2014-240359

(51) Int. Cl.
*G02B 7/02* (2006.01)
*G02B 27/00* (2006.01)
*G02B 7/00* (2006.01)

(52) U.S. Cl.
CPC ......... *G02B 27/0018* (2013.01); *G02B 7/006* (2013.01); *G02B 7/021* (2013.01); *G02B 7/022* (2013.01)

(58) Field of Classification Search
CPC .... G02B 27/0018; G02B 7/006; G02B 7/021; G02B 3/06
See application file for complete search history.

(56) References Cited

U.S. PATENT DOCUMENTS

| 7,530,699 B2 | 5/2009 | Shulepova et al. |
| 2005/0063074 A1* | 3/2005 | Hatakeyama ............ G02B 3/04 359/819 |

(Continued)

FOREIGN PATENT DOCUMENTS

| EP | 2357503 A1 | 8/2011 |
| JP | 2004-309567 A | 11/2004 |

(Continued)

OTHER PUBLICATIONS

International Search Report issued in PCT/JP2015/005924; dated Feb. 23, 2016.

(Continued)

*Primary Examiner* — Alicia M Harrington
(74) *Attorney, Agent, or Firm* — Studebaker & Brackett PC (57) ABSTRACT

A lens includes a lens body comprising a cylindrical surface along an optical axis direction and a fixed portion radially outwardly protruding from the lens body, comprising a diameter diminishing more and more from an image side toward a subject side along an optical axis of the lens body, and including an inclined surface contiguous to the cylindrical surface of the lens body.

8 Claims, 6 Drawing Sheets

(56) References Cited

U.S. PATENT DOCUMENTS

2005/0243429 A1    11/2005  Shulepova et al.
2010/0177409 A1     7/2010  Liu et al.
2015/0062727 A1*  3/2015  Kang .................... G02B 7/023
                                                                                            359/793

FOREIGN PATENT DOCUMENTS

| JP | 2005-532589 A | 10/2005 | | |
|----|---------------|---------|----|----|
| JP | 2007-052096 A | 3/2007 | | |
| JP | 2009-015004 A | 1/2009 | | |
| JP | 2010-134378 A | 6/2010 | | |
| JP | 2012163875 | * | 2/2011 | ............... G02B 7/02 |
| JP | 2011-048123 A | 3/2011 | | |
| JP | 2012-163875 A | 8/2012 | | |

OTHER PUBLICATIONS

Written Opinion issued in PCT/JP2015/005924; dated Feb. 23, 2016; with English language Concise Explanation.

* cited by examiner

LENS, LENS UNIT, AND IMAGING APPARATUS

CROSS REFERENCE TO RELATED APPLICATIONS

This application claims priority to and the benefit of Japanese Patent Application No. 2014-240359 (filed on Nov. 27, 2014), the entire contents of which are incorporated herein by reference.

TECHNICAL FIELD

This disclosure relates to a lens, a lens unit, and an imaging apparatus.

BACKGROUND

There is conventionally known a structure fixing a lens with a fixing member (a retainer).

SUMMARY

A lens according to one embodiment includes a lens body comprising a cylindrical surface along an optical axis direction and a fixed portion radially outwardly protruding from the lens body, comprising a diameter diminishing more and more from an image side toward a subject side along an optical axis of the lens body, and including an inclined surface contiguous to the cylindrical surface of the lens body.

A lens unit according to one embodiment includes the lens as described above, a lens holder arranged at a radially outside of the cylindrical surface and supporting the lens, and a fixing member coupled to the lens holder and in contact with the inclined surface so as to, together with the lens holder, fix the lens in a manner pressing the lens in the optical axis direction.

An imaging apparatus according to one embodiment includes the lens unit as described above and an image sensor for capturing a subject image formed by the lens unit.

DETAILED DESCRIPTION

For example, however, when known lens unit is mounted in a moving body such as a vehicle, the lens unit possibly breaks upon strong impact applied thereto by a foreign substance. It could be helpful to provide a lens that is less likely to break, a lens unit, and an imaging apparatus.

Hereinafter, embodiments of the disclosure will be described in detail with reference to the accompanying drawings.

First Embodiment

Figure 1:
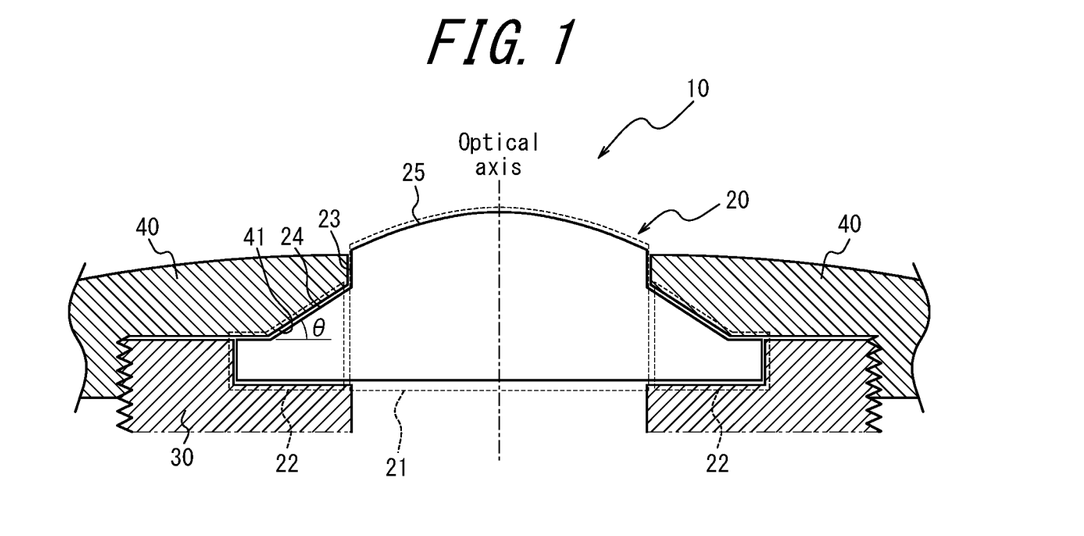
FIG. 1 is a cross-sectional side view illustrating a schematic configuration of a lens unit according to a first embodiment.

As illustrated in FIG. 1, a lens unit 10 includes a lens 20, a lens holder 30, and a fixing member 40. The lens holder 30 and the fixing member 40 are screwed together by screw fitting. The lens unit 10 forms, on an image plane, a subject image of a subject outside the lens unit 10.

The lens 20 is supported by the lens holder 30. The lens 20 includes a lens body 21 and a fixed portion 22 radially outwardly protruding in a flange shape from the lens body 21. The fixed portion 22 diminishes in diameter (tapers) along an optical axis of the lens body 21 from an image side toward a subject side. The lens 20 is fixed, at the fixed portion 22, by the fixing member 40 pressing the lens against the lens holder 30 along an optical axis direction. The fixing member 40 is, for example, a retainer and includes a contact portion 41 in contact with the fixed portion 22.

The lens body 21 includes an outer periphery forming a cylindrical surface 23 along the optical axis direction and contiguous to a lens surface 25 on the subject side of the lens 20.

The fixed portion 22 includes an inclined surface 24. The inclined surface 24 is a plane formed, on the subject side of the fixed portion 22, tapering along the optical axis of the lens body 21 from the image side toward the subject side. The inclined surface 24 is contiguous to the cylindrical surface 23 of the lens body 21. According to the present embodiment, as illustrated in FIG. 1, the inclined surface 24 is linear in cross-section. The inclined surface 24, from the outer periphery of the fixed portion 22 to the cylindrical surface 23, forms a predetermined elevation angle θ with respect to a plane (a horizontal plane in FIG. 1) perpendicular to the optical axis direction.

Figure 2:
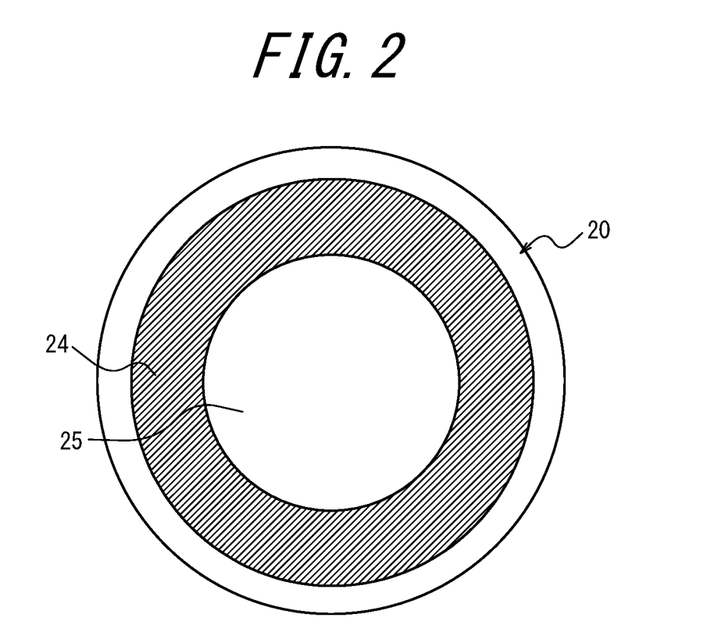
FIG. 2 is a top view of a lens illustrating a contact area of an inclined surface of a lens of FIG. 1 in contact with a fixing member.

According to the present embodiment, the contact portion 41 of the fixing member 40 is planar and in contact with the inclined surface 24 in its entirety. The fixed portion 22 is fixed at the inclined surface 24 having surface contact with the contact portion 41 of the fixing member 40 throughout a circumferential direction of the lens 20. FIG. 2 is a top view of the lens 20 illustrating a contact area of the inclined surface 24 of the lens 20 of FIG. 1 in contact with the fixing member 40. As illustrated in FIG. 2, the lens 20, in the top view thereof, includes the lens surface 25 at the center thereof and the inclined surface 24 surrounding the lens surface 25. The lens 20 of the present embodiment is in contact with the fixing member 40 in an entire shaded area of the inclined surface 24 in FIG. 2. According to the present embodiment, that is, the lens 20 is fixed being pressed by the fixing member 40 in the shaded area in FIG. 2.

Having the inclined surface 24 as illustrated in FIG. 1, the fixed portion 22 becomes thicker towards the center of the lens 20. Therefore, as compared to a lens 20 omitting the inclined surface 24, the lens 20 according to the present embodiment is more resistant to impact applied in the optical axis direction. Accordingly, the lens 20 of the present embodiment withstands impact caused by a foreign substance in the vicinity of a boundary between the fixing member 40 and the lens surface 25.

Figure 3:
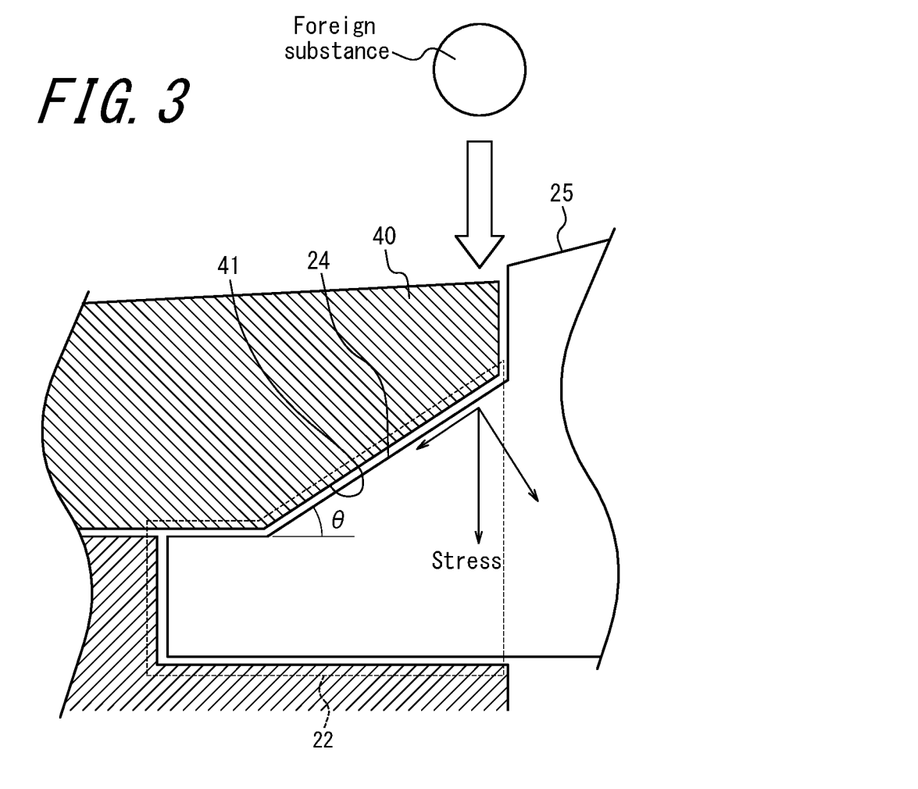
FIG. 3 is an enlarged view of a fixed portion of FIG. 1 and the vicinity thereof.

Also, having the inclined surface 24, the fixed portion 22 may disperse impulse force applied to the lens 20. FIG. 3 is an enlarged view of the fixed portion 22 and the vicinity thereof. In the present embodiment, as illustrated in FIG. 3, for example, when a foreign substance applies impact to the vicinity of the boundary between the fixing member 40 and the lens surface 25, the impulse force is generated in the optical axis direction (in a downward direction in FIG. 3) and travels through the fixing member 40 and reaches the fixed portion 22. Here, since the fixed portion 22 includes the inclined surface 24, the impulse force received by the fixed portion 22 may be dispersed into a direction along the inclined surface 24 and a direction orthogonal to the inclined surface 24, as illustrated in FIG. 3. In this way, the fixed portion 22, having the inclined surface 24, may disperse the impulse force applied in the optical axis direction. Accordingly, the lens 20 of the present embodiment is more resistant to impact as compared to the lens 20 omitting the inclined surface 24.

The elevation angle $\theta$ of the inclined surface 24 is appropriately set in accordance with design of the lens unit 10. Preferably, the elevation angle $\theta$, as described above, makes the lens 20 more resistant to impact caused by the impulse force applied to the fixed portion 22 while dispersing the impulse force. The elevation angle $\theta$ is within a range of, for example, 10 degrees or more and smaller than 70 degrees. When the elevation angle $\theta$ is 10 degrees or larger, the impulse force applied in the optical axis direction is dispersed and, also, a thickness of the fixed portion 22 is increased. Therefore, the lens 20 is less likely to break. Also, when the elevation angle $\theta$ is smaller than 70 degrees, the fixing member 40 may fix the lens 20 on the lens holder 30. When the elevation angle $\theta$ is 70 degrees or larger, the lens 20 may not be appropriately fixed due to insufficient clamping by the fixing member 40.

Second Embodiment

Figure 4:
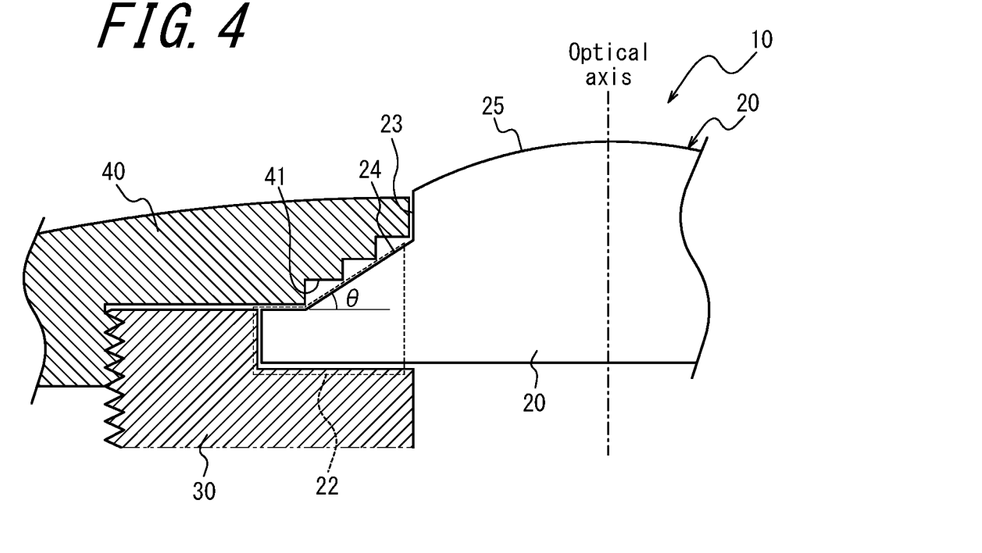
FIG. 4 is a cross-sectional side view illustrating a schematic configuration of a lens unit according to a second embodiment.

FIG. 4 is a cross-sectional side view illustrating a schematic configuration of a lens unit according to a second embodiment. In the second embodiment, the fixing member 40 includes a contact portion 41 having a step-like shape in cross-section. Hereinafter, descriptions of features the same as those of the first embodiment will be omitted, and different features will be described.

Figure 5:
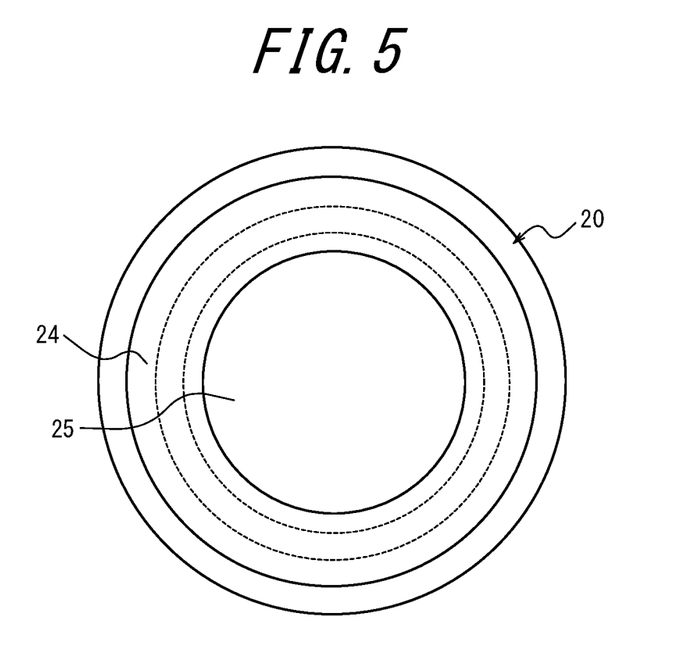
FIG. 5 is a top view of a lens illustrating contact positions on the inclined surface of the lens of FIG. 4 in contact with the fixing member.

According to the present embodiment, protruding portions of the contact portion 41 protruding to the inclined surface 24 are in contact with the inclined surface 24. That is, the fixed portion 22 is fixed at the inclined surface 24 throughout a circumferential direction thereof having concentric continuous linear contact with the contact portion 41 centered at the optical axis. The lens 20 of the present embodiment, on the inclined surface 24 as indicated by broken lines in FIG. 5, is in contact with the fixing member 40 via two concentric lines centered at the optical axis throughout the circumferential direction. In the present embodiment, accordingly, the lens 20 is fixed being pressed by the fixing member 40 on the broken lines illustrated in FIG. 5.

According to the present embodiment, also, the lens 20 includes the inclined surface 24. Similarly to the first embodiment, therefore, the lens 20 of the present embodiment is more resistant to impact as compared to the lens omitting the inclined surface 24. According to the present embodiment, also, when a foreign substance applies impact in the vicinity of the boundary between the fixing member 40 and the lens surface 25, the fixed portion 22 receives the impulse force on the lines in concentric contact with the lens surface 25. Therefore, the contact portion 41 may be designed to receive the impulse force applied by the foreign substance at a desired position on the fixed portion 22.

Third Embodiment

Figure 6:
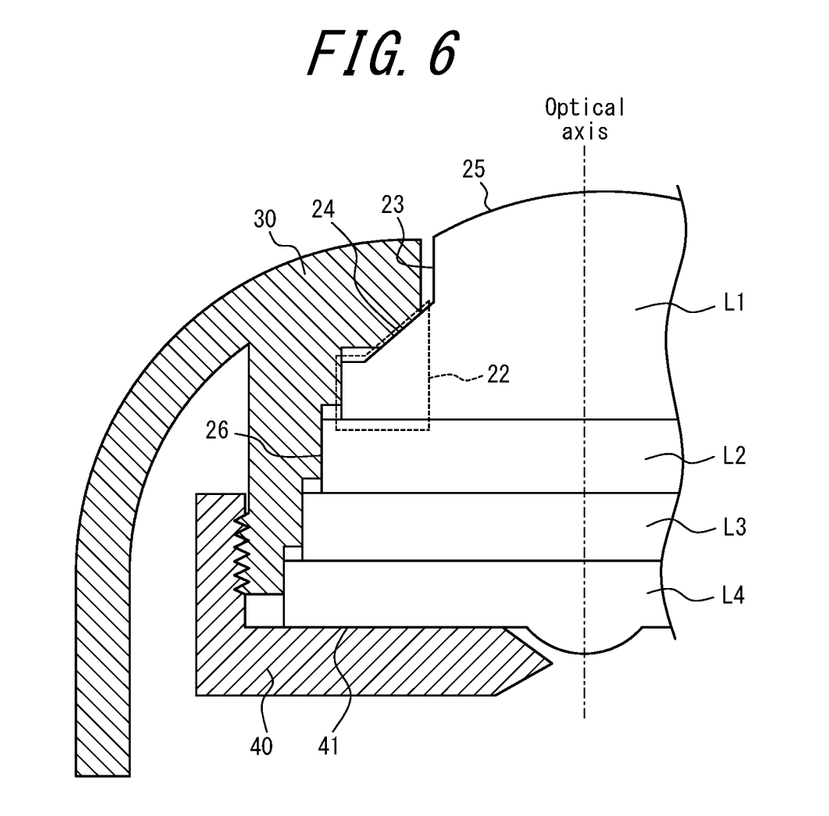
FIG. 6 is a cross-sectional side view illustrating a schematic configuration of a lens unit according to a third embodiment.

FIG. 6 is a cross-sectional side view illustrating a schematic configuration of a lens unit according to a third embodiment. According to the third embodiment, the lens unit includes four lenses: L1, L2, L3 and L4. The lenses L1, L2, L3 and L4 are held within the lens unit in a manner overlapping with each other in the mentioned order from the subject side to the image side. The lens L4 has a diameter larger than that of the lens L3, and the lens L3 has a diameter larger than that of the lens L2. The lens L2 has a diameter larger than a maximum diameter of the lens L1. The lens L1 includes the inclined surface 24 radially outwardly protruding from a body of the lens L1. The inclined surface 24 is tapered with respect to the optical axis of the body of the lens L1 from the image side to the subject side and contiguous to the cylindrical surface 23 of the body of the lens L1. Hereinafter, descriptions of features the same as those of the first embodiment will be omitted, and different features will be described.

According to the present embodiment, the lens L1 is fixed being pressed along the optical axis direction against the lens holder 30 located on the subject side via the lenses L2, L3 and L4. The fixing member 40 is in contact with an image-side surface of the lens L4 located closest to the image side among all the lenses.

According to the present embodiment, the inclined surface 24 of the fixed portion 22 is in contact with the lens holder 30. In the present embodiment, therefore, the lens L1 is pressed in the optical axis direction by the lens holder 30.

In an example illustrated in FIG. 6, further, the lenses L1, L2, L3 and L4 together form a peripheral surface 26 having a step-like shape. On the peripheral surface 26, an edge portion of a surface perpendicular to the optical axis, i.e., respective edge portions of subject-side surfaces of the lenses L1, L2, L3 and L4 are out of contact with the lens holder 30, while surfaces of the lenses L1, L2, L3 and L4 parallel to the optical axis are in contact with the lens holder 30.

According to the present embodiment, the lens L1 includes the inclined surface 24. Similarly to the first embodiment, therefore, the lens L1 is more resistant to impact as compared to the lens omitting the inclined surface 24.

Note that the disclosure is not limited to the above embodiments but may be modified or changed in a variety of manners. For example, functions and the like of each constituent and the like may be rearranged without logical inconsistency, so as to combine a plurality of constituents together or to separate them.

For example, although in the second embodiment as described above the fixed portion 22 is in contact with the fixing member 40 at the two concentric lines centered at the optical axis because of the step-like shape of the contact portion 41, the contact between the fixed portion 22 and the fixing member 40 is not limited to the two concentric lines.

Depending on a structure of the contact portion 41, the fixed portion 22 and the fixing member 40 may contact with each other at one, three, or more concentric lines.

Although in the second embodiment as described above the contact portion 41 has the step-like shape, the shape of the contact portion 41 is not limited thereto. The contact portion 41 may have any shape as long as being in contact with the inclined surface 24 of the fixed portion 22 at concentric lines centered at the optical axis.

Although in the first and second embodiments as described above the lens 20 is fixed by the fixing member 40 in the fixed portion 22 having the contiguous surface or linear contact with the fixing member 40, the contact between the fixed portion 22 and the fixing member 40 is not limited to contiguous contacts. The contact portion 41 may be designed to have intermittent contact with the inclined surface 24 in a circumferential direction of concentric lines centered at the optical axis such that the fixed portion 22 is in intermittent contact with the fixing member 40 on the inclined surface 24.

Figure 7A:
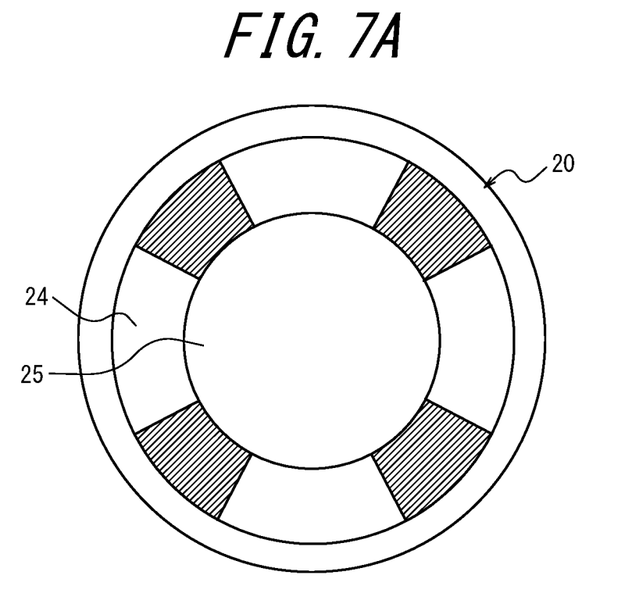
FIGS. 7A and 7B are top views of the lens illustrating variations of the contact area or the contact position of the inclined surface of the lens in contact with the fixing member.

For example, it is assumed that the contact portion 41 of the fixing member 40 includes protruding planar portions protruding to the image side and having surface contact with the inclined surface 24 and recessed portions recessed from the image side and out of contact with the inclined surface 24, and that the planar protruding portions and the recessed portions are alternately formed along a circumference of the inclined surface 24. In this case, the planar protruding portions of the contact portion 41 formed intermittently has surface contact with the inclined surface 24. When four planar protruding portions are provided at equal intervals along the circumference, the inclined surface 24 and the fixing member 40 have intermittent surface contact with each other in shaded areas as illustrated by a top view of the lens 20 in FIG. 7A, by way of example.

Figure 7B:
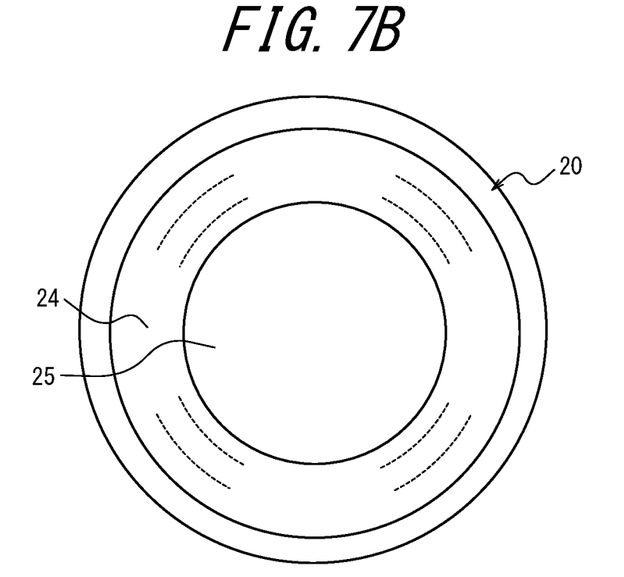

It is assumed that, for example, the fixing member 40 includes the contact portion 41 with protruding portions and the recessed portions alternately formed along the circumference in a manner similar to the above example, and that the protruding portions form the step-like shape as described in the second embodiment. In this case, the contact portion 41 is in linear contact with the inclined surface 24 at the protruding portions intermittently protruding to the inclined surface 24. When four protruding portions are provided at equal intervals along the circumference, the inclined surface 24 and the fixing member 40 have intermittent linear contact with each other on broken lines as illustrated by the top view of the lens 20 in FIG. 7B, by way of example.

Although in the first and second embodiments as described above the inclined surface 24 forms a straight line in cross-section, the shape of the inclined surface 24 is not limited thereto. For example, the inclined surface 24 may curve in cross-section. The contact portion 41 of the fixing member 40 is appropriately designed according to the shape of the inclined surface 24 so as to have surface contact or linear contact with the inclined surface 24.

Although in the first and second embodiments as described above the fixing member 40 is the retainer, the fixing member 40 is not limited thereto. The fixing member 40 may have, for example, a caulking structure to fix the fixed portion 22 in a pressing manner.

Figure 8:
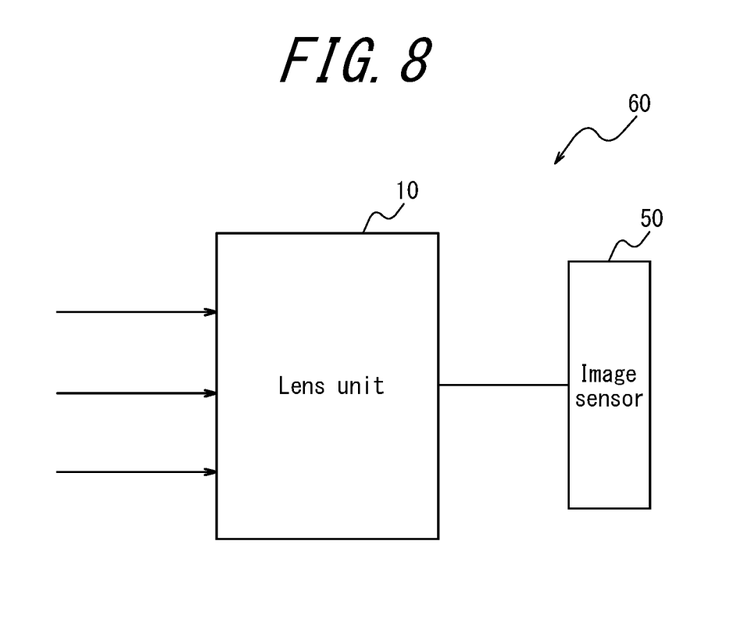
FIG. 8 is a functional block diagram illustrating a schematic configuration of an imaging apparatus having the lens unit of FIG. 1 or FIG. 4.

Further, the lens unit 10 of the first and second embodiments as described above may be mounted in an imaging apparatus. FIG. 8 is a functional block diagram illustrating a schematic configuration of an imaging apparatus having the lens unit 10. An imaging apparatus 60 includes the lens unit 10 described in the above first or second embodiment and an image sensor 50. The image sensor 50 captures a subject image formed on an image plane by the lens unit 10. When the imaging apparatus 60 as described above is mounted in a moving body and the like, the lens 20 having the inclined surface 24 withstands the impact caused by a foreign substance hitting the lens unit 10 of the imaging apparatus 60.

The invention claimed is:

1. A first lens comprising:
   a lens body comprising: a cylindrical surface along an optical axis direction; and
   a fixed portion radially outwardly protruding from the cylindrical surface of the lens body, the fixed portion including an inclined surface contiguous to the cylindrical surface of the lens body, the inclined surface tapering along the optical axis of the lens body from an image side toward a subject side, the diameter of the cylindrical surface and the diameter, at the subject side, of the inclined surface are the same.

2. A lens unit comprising:
   the first lens according to claim 1;
   a lens holder arranged at a radially outside of the cylindrical surface and supporting the first lens; and
   a fixing member coupled to the lens holder and in contact with the inclined surface so as to, together with the lens holder, fix the first lens in a manner pressing the first lens in the optical axis direction.

3. The lens unit according to claim 2, wherein the fixed portion is fixed at the inclined surface having surface contact with a contact portion of the fixing member.

4. The lens unit according to claim 2, wherein the fixed portion is fixed at the inclined surface having concentric linear contact with a contact portion of the fixing member centered at the optical axis.

5. The lens unit according to claim 2, wherein the fixed portion is fixed at the inclined surface having intermittent contact with a contact portion of the fixing member in a circumferential direction of concentric lines centered at the optical axis.

6. An imaging apparatus comprising:
   the lens unit according to claim 2; and
   an image sensor for capturing a subject image formed by the lens unit.

7. The lens unit according to claim 2,
   further including a plurality of lenses positioned adjacent to the first lens,
   the first lens and the plurality of lenses are arranged such that the first lens with smaller diameter is arranged at the subject side,
   the subject side surfaces of the lenses except for the first lens arranged nearest to the subject are contactless with the lens holder.

8. A lens unit comprising:
   the first lens according to claim 1;
   a lens holder arranged at a radially outside of the cylindrical surface and in contact with the first lens to support the first lens; and
   a fixing member coupled to the lens holder and, together with the lens holder, fixing the first lens in a manner pressing the first lens in the optical axis direction.

* * * * *